E. A. STAKE.
AUTOMOBILE SLEIGH.
APPLICATION FILED JAN. 30, 1915.
1,202,450.
Patented Oct. 24, 1916.
2 SHEETS—SHEET 1.
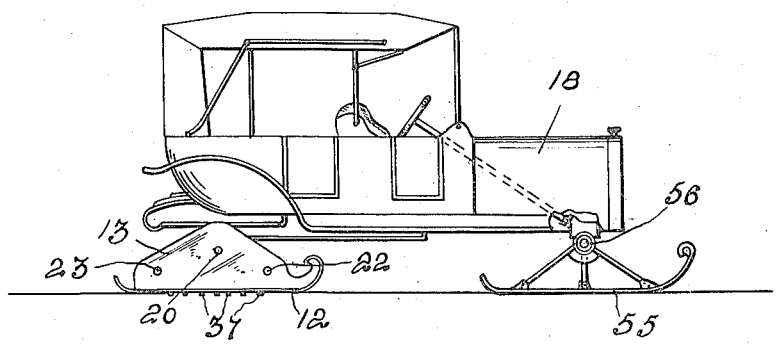
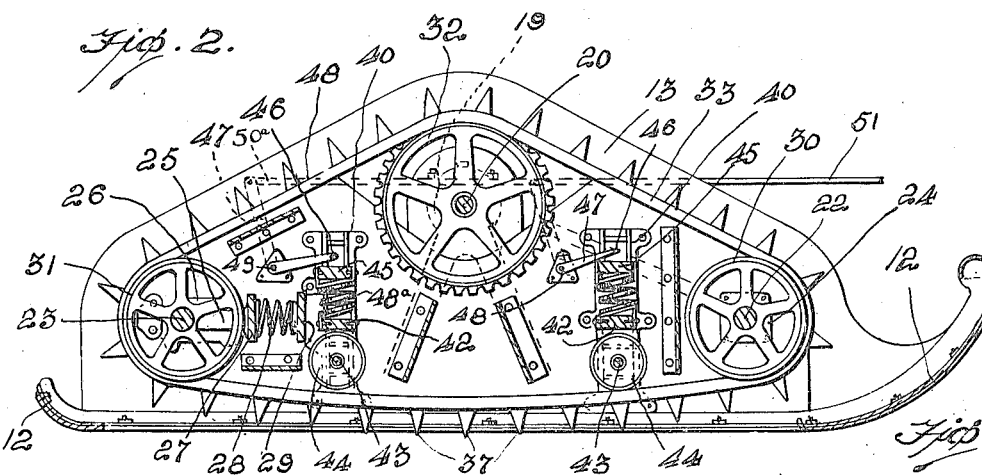
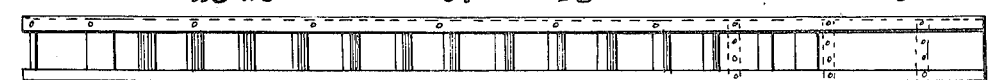
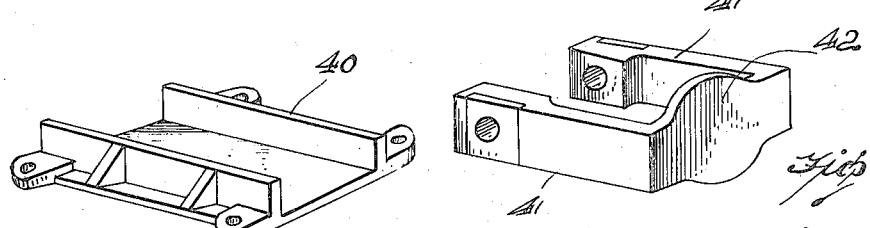
Witnesses
Inventor
E. A. Stake,
By
Attorney E. A. STAKE.
AUTOMOBILE SLEIGH.
APPLICATION FILED JAN. 30. 1915.
1,202,450.
Patented Oct. 24, 1916.
2 SHEETS—SHEET 2.
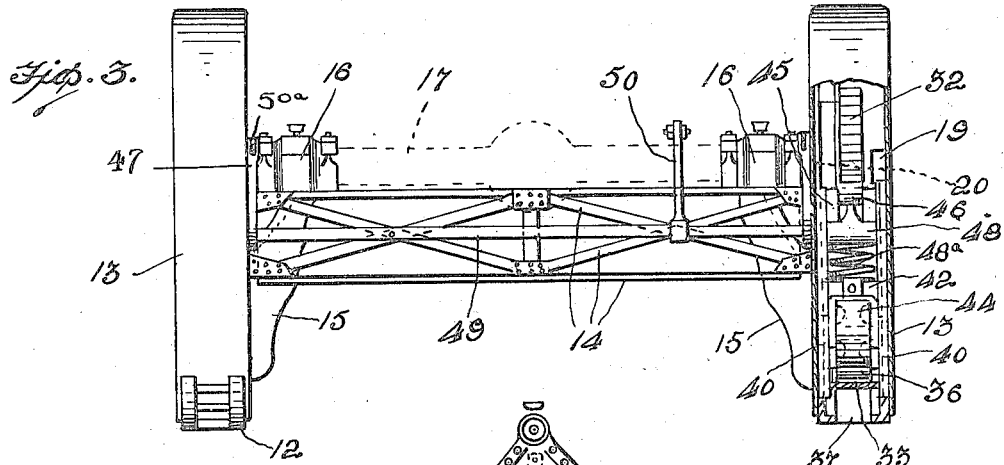
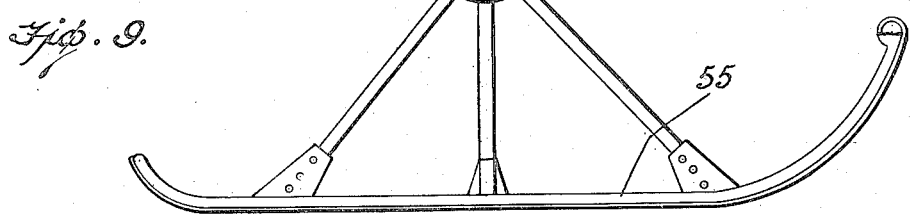
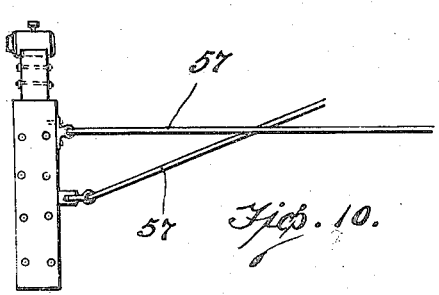
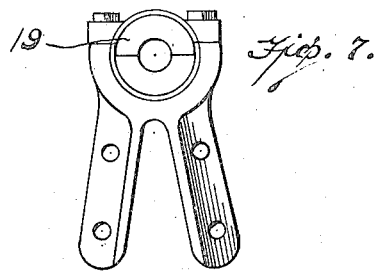
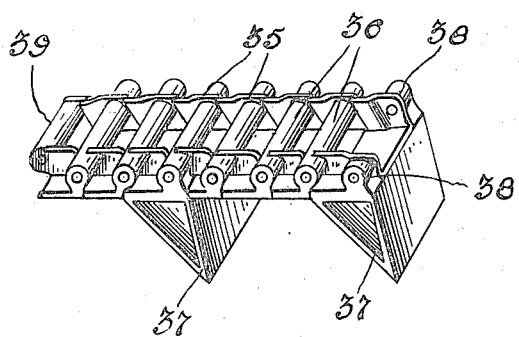
Inventor
E. A. Stake.

UNITED STATES PATENT OFFICE.

ERIK A. STAKE, OF GEM, IDAHO.

AUTOMOBILE SLEIGH.

1,202,450.  Specification of Letters Patent.  Patented Oct. 24, 1916.

Application filed January 30, 1915. Serial No. 5,273.

*To all whom it may concern:*

Be it known that I, ERIK A. STAKE, a citizen of the United States, residing at Gem, in the county of Shoshone and State of Idaho, have invented certain new and useful Improvements in Automobile Sleighs; and I do hereby declare the following to be a full, clear, and exact description of the invention, such as will enable others skilled in the art to which it appertains to make and use the same.

This invention relates to runner attachments for motor vehicles, and more particularly to a runner attachable to the running gear of an automobile and including means adapted to be connected with the driving gear of the vehicle to propel the latter.

The invention has for its object to provide an attachment of this character especially designed for motor vehicles embodying a casing in which is mounted a traction chain and adjustable means for forcibly retaining the chain in engagement with the ice.

Another object is the provision of an attachment for motor vehicles including means adapted to coöperate with the brake of the vehicle whereby the movement of the traction chain may be stopped or retarded to stop or retard the movement of the vehicle.

Another object is the provision of efficient and durable means for attaching the runners to the running gear of the vehicle.

With these and other objects in view, the invention consists in the novel construction, arrangement and formation of parts as will be hereinafter specifically described, claimed and illustrated in the accompanying drawing, in which:

Figure 1 represents a side elevation of the attachment applied to use upon an automobile. Fig. 2 represents a longitudinal sectional view through one of the rear or driving runner attachments. Fig. 3 represents a rear elevation, partly broken away, of a pair of the rear or driving runner attachments, showing the rear axle of a motor vehicle in dotted lines. Fig. 4 represents a perspective view of one of the links or sections of the chain removed. Fig. 5 represents a perspective view of one of the guide members removed. Fig. 6 represents a detail perspective view of one of the slidable bearing members removed. Fig. 7 represents a detail view, in side elevation, of one of the axle bearing members removed. Fig. 8 represents a bottom plan view of one of the runners removed. Fig. 9 represents a side elevation of one of the front or steering runners removed, and Fig. 10 represents a front elevation, partly broken away, of one of the front runner attachments removed.

Referring to the drawing in detail, wherein similar reference numerals designate corresponding parts throughout the several views, the numeral 12 indicates one of a pair of rear driving runners having the forward and rear extremities curved upwardly and carrying the spaced side walls 13 forming a casing for the driving mechanism. The runners are connected by a plurality of suitable bracing members 14 and the inner wall of the casing 13 of each is formed with an inwardly and upwardly directed arm 15 carrying bearing members 16 at their upper extremities adapted to be removably secured upon and adjacent the opposite ends of the rear axle casing 17 of a motor vehicle 18. A bearing member 19 is rigidly secured centrally of the inner face of the outer wall 13 of each runner and rotatably receives the extremity of the rear driving axle or axle section 20 of the motor vehicle.

Shafts 22 and 23 are rotatably mounted adjacent the forward and rear extremities, respectively, of the rear runner. The forward shaft 22 is mounted in relatively stationary bearings 24 while the shaft 23 is mounted in the parallel arms of a U-shaped bearing member 25 slidably mounted in the horizontally disposed guides 26 secured to the inner faces of the side walls of the casing 13. The web portion 27 of the bearing member 25 is engaged with one end of a spring 28, the opposite end of which is disposed against the relatively stationary abutment 29 secured between the side walls 13, whereby the bearing member 25 and shaft 23 are normally retained in rearwardly extended position, for a purpose which will hereinafter appear. Idler wheels 30 and 31 are secured upon the shafts 22 and 23, respectively, between the side walls 13 of each rear or driving runner, and the wheels are formed with spaced flanges.

As clearly illustrated in Fig. 2, the shafts 22 and 23 are arranged forwardly and rearwardly and below the driving axle 20 of the motor vehicle, and a gear or sprocket wheel 32 is secured adjacent each end of the axle or shaft 20. A traction chain 33 is adapted to travel upon the sprocket wheel 32 and wheels 30 and 31 in each runner and is driven from the rear driving axle 20 of the vehicle by the wheel 32. The traction chain 33 is received between the spaced flanges on the wheels 30 and 31.

Each traction chain 33 comprises a plurality of removable and interchangeable links or sections 35, as illustrated in Fig. 4, the inner surface of each section being formed with a plurality of transverse bars 36 adapted to mesh with the teeth of the sprocket wheel. The outer surfaces of the chain sections 35 are formed with a plurality of V-shaped teeth or spurs 37 to insure against the chains slipping over the snow or ice. One end of each chain section is formed with a pair of spaced ears 38 suitably apertured to receive a pin extended through a transversely apertured longitudinal extension 39 of the next succeeding section.

Pairs of vertically disposed guides 40 are secured to the inner surfaces of the side walls 13 of each casing adjacent the forward and rear ends thereof and slidably receive the parallel arms 41 of the inverted U-shaped bearing members having the web portions 42 enlarged, as clearly illustrated in Fig. 6. Shafts 43 are rotatably mounted in the lower free ends of the parallel arms 41 and tensioning rollers 44 rotatably mounted upon the shafts between the arms 41 of each bearing member. Above the bearing members 42 are mounted U-shaped members 45 which are also positioned within the guides 40 and are provided with upstanding parallel arms in which are pivotally secured the enlarged heads 46 carried by the arms of bell cranks 47. The forward bell cranks 47 in the casings 13 are pivotally secured at 48 in the latter, while the rear bell cranks are connected by a shaft 49 extending between the rear driving runners 12 and parallel with the rear axle casing 17 of the vehicle. The forward bell cranks are operated from the rear bell cranks by a connecting rod 50ª connecting the inner arms of said cranks.

Tensioning springs 48ª are disposed between the web portions of the members 42 and 45 and normally retain the lower bearing members in downwardly extended position and thus cause the rollers 44 to bear against the inner surface of the chain 33 and retain the latter in firm engagement with the snow or ice. A crank arm 50 is rigidly secured to the shaft 49 intermediate its ends and is connected by a connecting rod 51 with a suitable hand lever (not shown) located conveniently near the driver of the vehicle, whereby the rollers 44 may be adjusted as desired.

The wheels 30 and 31 are so arranged within the casing 13 that, when the tension behind the rollers 44 is reduced to the minimum by suitable adjustment of the bell cranks 47, the spring 28 slides the adjustable bearings 25, shaft 23 and wheel 31 rearwardly, thus drawing that portion of the chain disposed between and below the wheels 30 and 31 upwardly out of engagement with the snow or ice. The main driving wheels 32 arranged in the casings 13 are provided with inwardly directed flanges constituting drums adapted to coöperate with the internal or external brake band with which the automobile 8 is ordinarily equipped for stopping or retarding the movement of the wheel 31 and consequently the traction chain 33.

A pair of front runners, designated generally by the numerals 55, are removably attached to the front axles 56 of the motor vehicle and are connected by suitable bracing elements 57.

In operation, the traction chains 33 arranged in the rear vehicle or driving runners 12 are driven by the rear driving axle 20 of the motor vehicle through the wheels 32. By suitable adjustment of the lever, not shown, the tension of the springs 48ª against the bearing members 41 will cause the rollers 44 to exert downward pressure upon the lower portion of the traction chain 33 until the teeth 37 thereof project a sufficient distance below the runners 12 to insure against the chain slipping over the snow or ice. When it is desired to stop or retard the movement of the vehicle, the brake controlling lever, not shown, is actuated so as to cause the brake band to come into frictional engagement with the flanges of the wheels 32 and thus retard or stop the movement of the latter and consequently the movement of the traction chains 33. When the bell cranks 47 are adjusted so as to relieve the rollers 44 of pressure, the tension of the springs 28 lifts the lower portions of the traction chains 33 above the lower surfaces of the runners 12 and out of frictional engagement with the snow or ice.

What I claim is:

A runner attachment for vehicles including a runner, a casing secured thereto, a traction chain arranged in said casing, means resiliently supporting the lower portion of said chain in inoperative position, guides mounted in said casing above the lower portion of said chain, rollers rotatably mounted in said guides and normally engaging the upper surface of the lower portion of said chain, U-shaped members slidably mounted in said guides above said rollers, tensioning springs interposed between said rollers and said U-shaped members, and bell cranks pivotally mounted in said casing having enlarged heads at one end pivotally mounted in the parallel ends of the U-shaped members for actuating the latter.

In testimony whereof I affix my signature in presence of two witnesses.

ERIK A. STAKE.

Witnesses:
   Chas. H. Wilson,
   L. Leighty.